US006337786B1

(12) United States Patent
Haake et al.

(10) Patent No.: US 6,337,786 B1

(45) Date of Patent: Jan. 8, 2002

(54) ELECTRIC SWITCHING DEVICE WITH CLOSED-CIRCUIT PROTECTION

(76) Inventors: Andre Haake; Oliver Haake; Patrick Haake, all of Eschlohn 24, D-46354 Sudlohn (DE)

( * ) Notice: Subject to any disclaimer, the term of this patent is extended or adjusted under 35 U.S.C. 154(b) by 0 days.

(21) Appl. No.: 09/485,508

(22) PCT Filed: Dec. 18, 1997

(86) PCT No.: PCT/DE97/02976

§ 371 Date: Feb. 10, 2000

§ 102(e) Date: Feb. 10, 2000

(87) PCT Pub. No.: WO99/33077

PCT Pub. Date: Jul. 1, 1999

(51) Int. Cl.[7] .................................................. H02H 3/00

(52) U.S. Cl. ........................................................ 361/42

(58) Field of Search ............................. 361/42, 46, 50, 361/56, 57; 429/92, 93

(56) References Cited

U.S. PATENT DOCUMENTS 5,942,966 A 8/1999 Haake et al.

FOREIGN PATENT DOCUMENTS

EP 0 234 523 A 9/1987

FR 2 135 922 12/1972

OTHER PUBLICATIONS

International Search Report for PCT/CE/02976, dated Jul. 31, 1998.

*Primary Examiner*—Edward H. Tso

(74) *Attorney, Agent, or Firm*—Merchant & Gould, P.C.

(57) ABSTRACT

The invention relates to an electric switching device with a signalling element which triggers a switching function when the closed circuit is interrupted, a relay safety assembly being switched into the closed circuit. The incoming and outgoing electrical lines from the closed circuit to the signalling element are each surrounded by a safety shielding which is connected to the earth potential of the signalling element at one end and to the protective-conductor terminal of the relay safety assembly at the other end. The secondary circuit of the transformer in the relay safety assembly is connected to the safety shielding on one side.

2 Claims, 1 Drawing Sheet

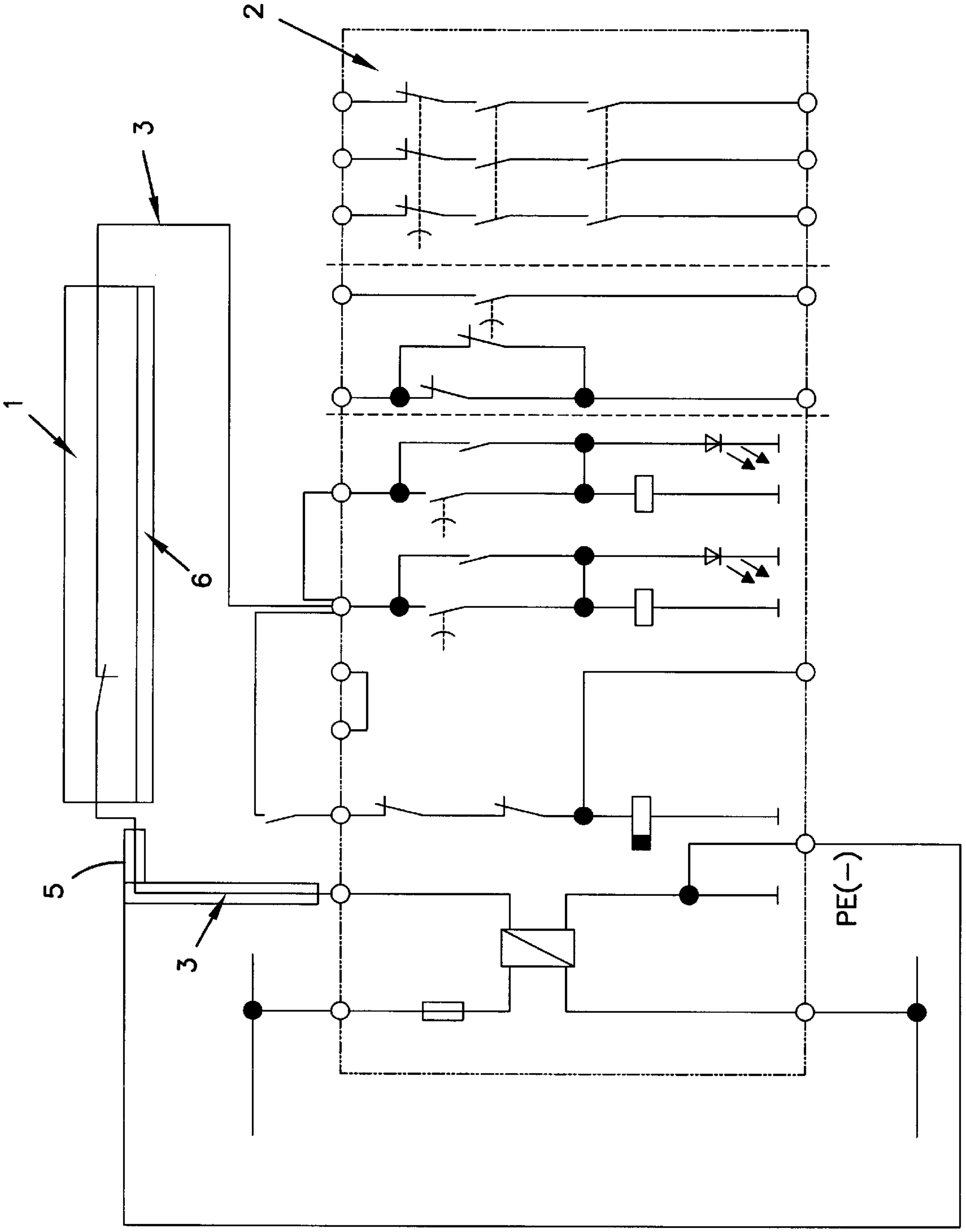
2
3
1
6
5
3
PE(−)

ELECTRIC SWITCHING DEVICE WITH CLOSED-CIRCUIT PROTECTION

The invention relates to an electric switching device. The electric switching device has a signaling element, e.g. a switching strip, which leads to a switching function in the event of a closed circuit being interrupted. The switching device also includes a relay safety assembly connected into the closed circuit.

Electric switching devices of this type are described e.g. in EP 234 523 B1, to be precise in connection with a closing-edge fuse. Closing-edge fuse systems of this type are provided for use on motor-driven doors and gates in buildings and public transport means, movable shelves and on protection devices for machines. A closed-circuit current flows in the actual switching strip and is monitored by an evaluating unit. Contact is made as a result of the closed-circuit current being interrupted. Load reduction is followed by automatic resetting for the purpose of closing the closed circuit.

The so-called evaluating unit—or also called relay safety assembly—is likewise known in many different forms in the prior art and monitors itself continually by the closed-circuit principle. Faults such as short circuit-cable breakage-profile interruptions and incorrect connection lead to the disconnection of the load circuits. In the prior art, evaluating units of this type are referred to by the technical designation "relay safety assembly".

These known arrangements have the disadvantage that a single-ended earth fault is not identified since the device continues to remain functional.

The invention is based on the object of providing a line monitoring arrangement which both demonstrates a single earth fault and reacts appropriately in the event of a short circuit.

This object on which the invention is based is achieved by means of the fact that the incoming electrical line of the closed circuit to the signaling element is surrounded by a conductive safety screen which is connected to the protective conductor terminal of the relay safety assembly, the secondary circuit of the transformer in the relay safety assembly being connected to the safety screen on one side.

If such an arrangement is used in conjunction with a closing-edge fuse, a control signal which effects disconnection of the load circuits occurs even in the event of an earth fault of the incoming line of the closed circuit.

In order to illustrate the invention, a block diagram of a relay safety assembly known in the prior art, type: "BN 5983", is enclosed in the Appendix, the screening according to the invention being additionally illustrated in this block diagram.

In the drawing, the switching strip is represented by 1 and the fixing strip for the switching strip 1 is represented by 6, the fixing strip 6 usually being composed of metal. In the switching strip 1, the actual conductor 3 lies above the fixing strip 6, as is known in the prior art.

According to the invention, this conductor 3 is surrounded by a safety screening 5, which, as shown in the drawing, is connected to the protective-conductor terminal PE(−) of the relay safety assembly 2, with the result that disconnection of the load circuits is thereby effected even in the event of an earth fault of the incoming line of the closed circuit.

What is claimed is:

1. An electric switching device, comprising:

a switching strip for switching at least one circuit between an open and a closed configuration;

an incoming electrical line connected to the switching strip;

a conductive safety screen disposed around at least a portion of the incoming electrical line;

a relay safety assembly connected to the incoming electrical line, the relay safety assembly comprising a transformer, the transformer comprising a protective-conductor terminal, the protective-conductor terminal being connected to the conductive safety screen;

a secondary circuit, the secondary circuit being connected to the conductive safety screen;

wherein the relay safety assembly sends a signal to the switching strip in the event of a single earth fault or a short circuit; and wherein the switching strip switches the at least one circuit upon receiving the signal.

2. An electric switching device as in claim 1, wherein the switching strip is adapted to switch a closing edge fuse.

* * * * *